United States Patent [19]

Davis

[11] Patent Number: 5,598,946
[45] Date of Patent: Feb. 4, 1997

[54] INSULATED FABRIC SERVING DISH HOLDER

[76] Inventor: MaryAnn Davis, 138 W. Central Ave., Delaware, Ohio 43015

[21] Appl. No.: 592,918

[22] Filed: Jan. 29, 1996

[51] Int. Cl.$^6$ .................................................. B65D 25/34
[52] U.S. Cl. ...................... 220/739; 150/901; 220/400; 220/461
[58] Field of Search ...................... 220/400, 408, 220/410, 460, 461, 902, 903, 737, 739; 150/154, 901

[56] References Cited

U.S. PATENT DOCUMENTS

| | | | |
|---|---|---|---|
| 2,482,322 | 9/1949 | Cortese | 220/903 |
| 2,490,250 | 12/1949 | Boener | 150/154 |
| 3,598,438 | 8/1971 | Taft | 294/29 |
| 3,990,495 | 11/1976 | LaBarba | 220/902 |
| 4,197,832 | 4/1980 | Thomas et al. | 220/400 |
| 4,282,279 | 8/1981 | Strickland | 220/903 |
| 4,705,085 | 11/1987 | Brown | 220/903 |
| 5,169,025 | 12/1992 | Guo | 220/903 |

FOREIGN PATENT DOCUMENTS 2400 of 1890 United Kingdom .................... 150/901

*Primary Examiner*—Stephen J. Castellano

[57] ABSTRACT

An insulated fabric serving dish holder comprimising a bottom panel and a perpendicular side panel made of decorative fabric, lined and having a seam connecting the perimeter of the bottom panel to the bottom of the side panel. The holder is made to fit snugly around various sized and geometrically shaped serving dishes, with fasteners located on either end of the side panel to secure the ends of the side panel to one another to fit around the perimeter of the serving dish. The purpose of the holder is to protect the hands of people serving food from the hot serving dishes, as well as protect the dining table from burns. It also has a decorative function.

2 Claims, 1 Drawing Sheet

INSULATED FABRIC SERVING DISH HOLDER

BACKGROUND OF THE INVENTION

1. Field of the Invention

The present invention relates to holders for serving dishes. More specifically, the present invention relates to insulated fabric serving dish holders.

2. Prior Art

Handling hot bowls and serving dishes is often a mealtime problem. The most common approach to this problem is to use pot holders to move the hot dishes from the cooking area to the dining table, and again to pass the bowls and dishes from one diner to the next. This approach does keep the diners from burning their fingers, but it does not protect the dining table from hot serving dishes, and forces the diners to keep track of the various pot holders with the actual serving dishes.

Casserole dishes, pans, pots and bowls can be converted into serving dishes through the use of this holder, reducing the clutter and cleanup of separate cooking and serving dishes.

Serving holders are well known in the art, however, serving holders disclosed in the prior art do not address all the needs that are addressed by this invention. This invention is insulating, decorative, washable, easy to use and adjustable to fit various geometric shaped and sized serving dishes which are similar in circumference.

Some examples of the prior art serving holders are set forth in the patents described below.

The Hibbert U.S. Pat. No. 3,507,312 shows a fabric dish and pan holder which has an elastic around the top perimeter to snugly fit the serving dish, but does not address the difficulty of inserting the hot dish into the holder. The difficulty arises in attempting to maneuver the hot serving dish into the holder that has a tight fitting, elasticized opening. This prior art also has fabric handles crisscrossed across the opening. After inserting the serving dish into the holder, the fabric handles would fall into the food, making a mess of the food, and also making the handles inoperative without getting food on the diner's hands.

The LaBarba U.S. Pat. No. 3,990,459 also shows an insulated warmer and serving receptacle which does not have the problems described above, but does not fit snugly around the serving dish. With this art, it is possible that the serving dish might easily slip out of the holder, causing food to spill and burns to occur.

The Harnden U.S. Pat. No. 3,745,290 shows a serving vessel that is made of plastic, glass, and ceramic, not fabric. Thus, it is not foldable, or decorative in the sense of a fabric holder that can be made of the same or coordinating cloth as the tablecloth and napkins.

The Spoeth U.S. Pat. No. 3,971,360, as in the above mentioned Harnden patent, is not made of fabric.

Neither the Kuhn U.S. Pat. No. 4,204,609 or the Taft U.S. Pat. No. 3,598,438 are made of fabric. There are other prior art that show insulated containers.

The Strickland U.S. Pat. No. 4,282,279 shows an insulated container cover with no bottom, more applicable to cold bottles than warm serving dishes.

The Hobson U.S. Pat. No. 4,871,597 also shows an insulating enclosure with four insulating layers to be used for bottles of liquids, not serving dishes.

The Skamser U.S. Pat. No. 4,578,814 shows an insulated food bag, appropriate for transporting pizzas, not serving dishes.

Whatever the precise merits features and advantages of the above cited references, none of them achieves or fulfills the purposes of the insulated fabric serving dish holder of the present invention.

SUMMARY OF THE INVENTION

The principal object of the present invention is to provide a device made of fabric that insulates serving dishes so that diners do not burn their hands while serving and passing hot serving dishes of food. Another object is that it is made of decorative fabric with a fastener so that the holder fits snugly around the serving dish to prevent the serving dish from slipping and spilling food.

DETAILED DESCRIPTION

Figure 1:
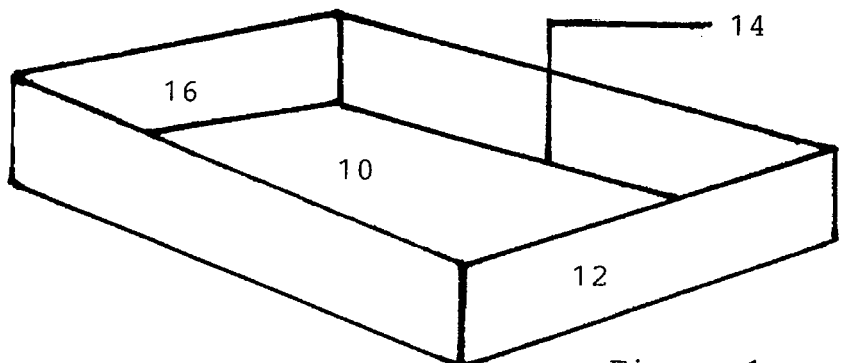
FIG. 1 is a perspective view illustrating the insulated fabric serving dish holder of the present invention.

Refer now to FIG. 1, which is an overall drawing of a preferred embodiment of the invention. As shown in the drawing, the insulated fabric serving dish holder includes a bottom panel 10 and an upwardly extending peripheral side wall panel 12 which are connected by a seam 14 at the bottom of the peripheral side wall panel to the outer edges of the bottom panel. Each panel is made of cloth fabric, with finished edges and is lined 16 to provide additional insulation and an attractive finish. The fabric used is of a decorative nature, to enhance the appearance of the food being served, as well as to complement other dining objects, such as dinnerware, napkins and tablecloths.

Figure 2:
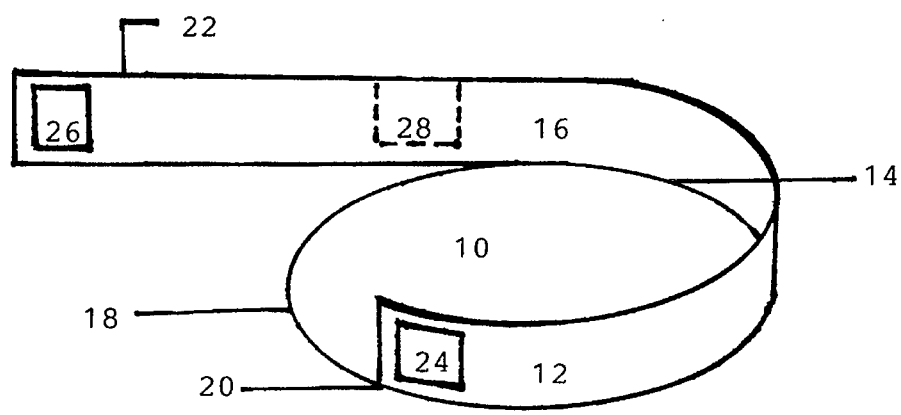
FIG. 2 displays a side view of the insulated fabric serving dish holder unfastened, showing the three parts, including inner layer, of the side panel.
Figure 3:
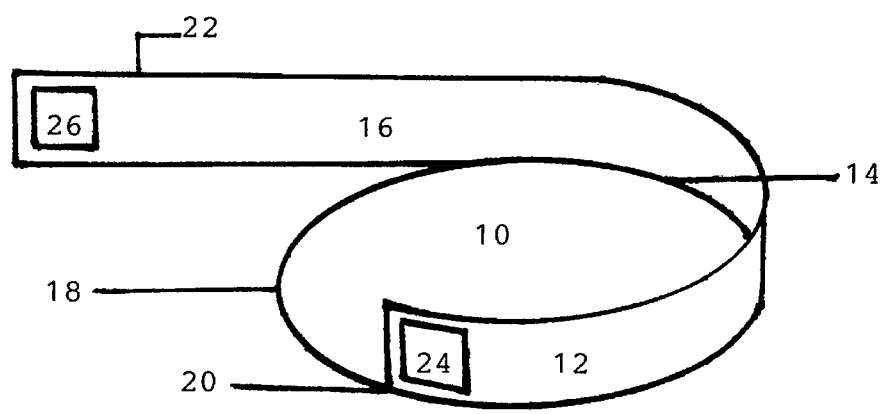
FIG. 3 shows a perspective view of the insulated fabric serving dish holder unfastened.

The bottom panel and perpendicular side wall panel are attached together by a sewn seam 14, which covers most of the perimeter of the bottom panel and most of the bottom of the side wall panel. FIG. 2 illustrates the connecting seam 14 of the side and bottom panels, and the section of panel 18 that is not connected. The purpose of this opening is to allow the serving dish to easily be placed into the present invention, for the side panel to wrap around the serving dish snugly, and overlap the other arm of the side panel, adjusting to enclose the perimeter of the serving dish. FIG. 3 illustrates the holder opened and ready to accept the serving dish. The bottom of the side panel is attached to the bottom panel completely at one end 20, known here as the side panel stationary arm. The other end of the side panel, known here as the flap arm 22 of the side panel, is not connected to the bottom panel. In order to secure the flap arm of the side panel to the stationary arm of the side panel a fastener is used.

In the preferred embodiment, the first fastening means is formed of a plurality of hook-like members, and the second fastening means is formed of extended pile-like members adapted to be engaged by and held securely by the plurality of hook-like members of the first fastening means. The two fastening means can be pulled apart, which will separate the hook-like members from the pile-like members. The preferred embodiment uses a fastener sold under the trademark Velcro. It is envisioned that other releasable fasteners may be used instead.

In order to enclose the side panels around the serving dish, a fastening strip 24 is sewn on the outside of the stationary arm of the side panel. A corresponding fastening strip 26 is attached on the inside of the flap arm of the side panel. When the flap arm of the side panel is pulled around the perimeter of the serving dish the invention closes securely around the dish, as the corresponding fastening strips on either end of the side wall panel are overlapped and pressed together. The side and bottom panels have a third inner layer 28 of fabric for additional insulation. The insulating inner panel may be made of any type of material that may increase the insulating ability of the holder.

FIG. 3 illustrates the holder opened, ready to accept the serving dish.

The use of the insulated fabric serving dish holder as disclosed herein has been described for serving hot dishes of food. It is also envisioned that the serving dishes contain chilled food, thus the insulating factor aids in keeping the food cold, not hot. It is anticipated that a hot pack, or cold pack could be placed inside of the serving holder to further increase the temperature control of the food in the serving dish. It is also envisioned that the serving holder be used as a decorative device, ignoring the insulation factor of the holder altogether.

The shape of the serving dish holder could be in a wide variety of geometric shapes, the significant factor being the shape and dimension of the exterior surface of the serving dish to be held and insulated. The lining of the invention may be made of the same fabric as the outside, or may be of a complementary fabric, or a separate fabric used purely for insulating value. The inner layer may be made of any type of fabric that may increase the insulating ability of the holder. It is also possible that another embodiment may have a quilted appearance, or another outer surface to make a more interesting design, or to make the holder easier to handle.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An insulated fabric serving dish holder comprising:

a bottom panel made of an outwardly disposed first fabric layer and at least one inwardly disposed first insulative layer;

a side panel, perpendicular to said bottom panel, made of an outwardly disposed second fabric layer, an inwardly disposed lining fabric layer and a second insulative layer disposed between said second fabric layer and said lining fabric layer;

said side panel is attached to said bottom panel by a sewn seam connecting only a portion of the bottom edge of said side panel to only a portion of the peripheral edge of said bottom panel, an unattached portion of the bottom edge of said side panel and an unattached portion of the peripheral edge of said bottom panel are adjacent to each other and allow said side panel to wrap around and enclose the serving dish, a first end of said side panel which is adjacent to the unattached portion of the bottom edge overlaps a second opposite end of said side panel;

a first fastening means located on the outside wall of said side panel adjacent said second end;

a second fastening means located upon the inside wall of said lining fabric layer of said side panel adjacent said first end;

said side panel being adapted to be positioned and formed snugly around the exterior surface of the serving dish with said first and second fastening means engaged with each other, said unattached portions of the bottom edge of said side panel and of the peripheral edge of said bottom panel allow movement of said second fastening means in relation to said first fastening means to allow said side panel to adjust to the size of the serving dish by adjusting the degree of overlap of the first end with the second end to hold the serving dish tightly, to insulate the dish from the environment and to protect the hands of a user.

2. The insulated fabric serving dish holder of claim 1 wherein said first fastening means is formed of a plurality of small hook-like members; and the said second fastening means is formed of soft, extended pile-like fabric members which are adapted to be engaged by and held securely by the plurality of hook-like members, said hook-like members and said pile-like members being adapted to engage each other in a tight clamping relationship when the hook-like members are urged into intimate engagement with the extended pile-like members and being adapted to be separated therefrom in response to a separation force which withdraws and separates the hook-like-members from the extended pile-like members.

* * * * *